US012386546B2

(12) United States Patent
Goller

(10) Patent No.: US 12,386,546 B2
(45) Date of Patent: Aug. 12, 2025

(54) PROCESSING SYSTEM, RELATED INTEGRATED CIRCUIT, DEVICE AND METHOD

(71) Applicant: STMicroelectronics S.r.l., Agrate Brianza (IT)

(72) Inventor: Federico Goller, Turin (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 256 days.

(21) Appl. No.: 18/116,372

(22) Filed: Mar. 2, 2023

(65) Prior Publication Data
US 2023/0280933 A1 Sep. 7, 2023

(30) Foreign Application Priority Data
Mar. 3, 2022 (IT) .......................... 102022000004046

(51) Int. Cl.
*G06F 3/06* (2006.01)
(52) U.S. Cl.
CPC .......... *G06F 3/0655* (2013.01); *G06F 3/0619* (2013.01); *G06F 3/0673* (2013.01)
(58) Field of Classification Search
CPC .... G06F 3/0655; G06F 3/0619; G06F 3/0673; G06F 11/1048
USPC .......................................................... 714/763
See application file for complete search history.

(56) References Cited

U.S. PATENT DOCUMENTS

| 9,385,754 | B2* | 7/2016 | Sakai | H03M 13/1117 |
| 11,762,736 | B2* | 9/2023 | Kim | G06F 11/1068 |
| | | | | 714/764 |
| 2011/0004795 | A1* | 1/2011 | Chyan | G11C 29/02 |
| | | | | 714/E11.159 |
| 2011/0099451 | A1 | 4/2011 | Wezelenburg et al. | |
| 2013/0170296 | A1* | 7/2013 | Yun | G11C 16/06 |
| | | | | 365/185.09 |
| 2015/0254136 | A1* | 9/2015 | Hoya | G06F 11/1012 |
| | | | | 714/764 |
| 2019/0114236 | A1 | 4/2019 | Han et al. | |
| 2020/0371862 | A1 | 11/2020 | Thompson et al. | |
| 2024/0012712 | A1* | 1/2024 | Kim | G11C 11/4096 |

OTHER PUBLICATIONS

IT Search Report and Written Opinion for priority application, IT 102022000004046, report dated Oct. 17, 2022, 11 pgs.

* cited by examiner

*Primary Examiner* — James C Kerveros
(74) *Attorney, Agent, or Firm* — Crowe & Dunlevy LLC

(57) ABSTRACT

A slave provides second data bits and ECC bits in response to a master read request. First data bits are generated by selecting between the second data bits and third data bits produced from error correcting the second data bits. The third data bits are generated with a delay of one clock cycle with respect to the second data bits. If an address of the read request is stored to a memory, a control signal is set indicating that the first data bits are invalid and this drives selection of the third data bits (with the first data bits now being valid in a following clock cycle). If an error signal is asserted when the address is not stored to the memory, action is taken to store the address to the memory and a further control signal is set to indicate that the read request should be repeated.

24 Claims, 8 Drawing Sheets

PROCESSING SYSTEM, RELATED INTEGRATED CIRCUIT, DEVICE AND METHOD

PRIORITY CLAIM

This application claims the priority benefit of Italian Application for Patent No. 102022000004046 filed on Mar. 3, 2022, the content of which is hereby incorporated by reference in its entirety to the maximum extent allowable by law.

TECHNICAL FIELD

Embodiments of the present disclosure relate to error correction within processing systems, such as micro-controllers.

BACKGROUND

FIG. 1 shows an electronic system, such as the electronic system of a vehicle, comprising a plurality of processing systems (PS) 10, such as embedded systems or integrated circuits, e.g., a Field Programmable Gate Array (FPGA), a Digital Signal Processor (DSP) or a micro-controller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. The processing systems 10 may, for example, be located at different positions of the vehicle and may include, e.g., an Engine Control Unit, a Transmission Control Unit (TCU), an Anti-lock Braking System (ABS), a Body Control Module (BCM), and/or a navigation and/or multimedia audio system. Accordingly, one or more of the processing systems 10 may also implement real-time control and regulation functions. These processing systems are usually identified as Electronic Control Units.

FIG. 2 shows a block diagram of an exemplary digital processing system 10, such as a micro-controller, which may be used as any of the processing systems 10 of FIG. 1.

In the example considered, the processing system 10 comprises a microprocessor (MP) 102, usually the Central Processing Unit (CPU), programmed via software instructions. Usually, the software executed by the microprocessor 102 is stored in a non-volatile program memory (Mem) 104, such as a Flash memory or EEPROM. Thus, the memory 104 is configured to store the firmware of the processing unit 102, wherein the firmware includes the software instructions to be executed by the microprocessor 102. Generally, the non-volatile memory 104 may also be used to store other data, such as configuration data, e.g., calibration data.

The microprocessor 102 usually has associated also a volatile memory (Vmem) 104b, such as a Random-Access-Memory (RAM). For example, the memory 104b may be used to store temporary data.

As shown in FIG. 2, usually the communication with the memories 104 and/or 104b is performed via one or more memory controllers (MC) 100. The memory controller(s) 100 may be integrated in the microprocessor 102 or connected to the microprocessor 102 via a communication channel, such as a system bus of the processing system 10. Similarly, the memories 104 and/or 104b may be integrated with the microprocessor 102 in a single integrated circuit, or the memories 104 and/or 104b may be in the form of a separate integrated circuit and connected to the microprocessor 102, e.g., via the traces of a printed circuit board.

In the example considered, the microprocessor 102 may have associated one or more (hardware) resources/peripherals 106 selected from the group of:

- one or more communication interfaces IF, e.g., for exchanging data via the communication system 20, such as a Universal asynchronous receiver/transmitter (UART), Serial Peripheral Interface Bus (SPI), Inter-Integrated Circuit ($I^2C$), Controller Area Network (CAN) bus, and/or Ethernet interface, and/or a debug interface; and/or
- one or more analog-to-digital converters AD and/or digital-to-analog converters DA; and/or
- one or more dedicated digital components DC, such as hardware timers and/or counters, or a cryptographic co-processor; and/or
- one or more analog components AC, such as comparators, sensors, such as a temperature sensor, etc.; and/or
- one or more mixed signal components MSC, such as a PWM (Pulse-Width Modulation) driver.

Generally, said dedicated digital components DC may also correspond to a FPGA integrated in the processing system 10. For example, in this case, the memory 104 may also comprise the program data for such a FPGA.

Accordingly, the digital processing system 10 may support different functionalities. For example, the behavior of the microprocessor 102 is determined by the firmware stored in the memory 104, e.g., the software instructions to be executed by a microprocessor 102 of a micro-controller 10. Thus, by installing a different firmware, the same hardware (micro-controller) can be used for different applications.

In this respect, future generation of such processing systems 10, e.g., micro-controllers adapted to be used in automotive applications, are expected to exhibit an increase in complexity, mainly due to the increasing number of requested functionalities (new protocols, new features, etc.) and to the tight constraints of execution conditions (e.g., lower power consumption, increased calculation power and speed, etc.).

For example, recently more complex multi-core processing systems 10 have been proposed. For example, such multi-core processing systems may be used to execute (in parallel) several of the processing systems 10 shown in FIG. 1, such as several ECUs of a vehicle.

FIG. 3 shows an example of a multi-core processing system 10. Specifically, in the example considered, the processing system 10 comprises a plurality of n processing cores (PC) $102_1, \ldots, 102_n$, connected to a (on-chip) communication system 114. For example, in the context of real-time control systems, the processing cores $102_1, \ldots, 102_n$, may be ARM Cortex®-R52 cores. Generally, the communication system 114 may comprise one or more bus systems, e.g., based on the Advanced eXtensible Interface (AXI) bus architecture, and/or a Network-on-Chip (NoC).

For example, as shown at the example of the processing core $102_1$, each processing core 102 may comprise a microprocessor (m) 1020 and a communication interface (i) 1022 configured to manage the communication between the microprocessor 1020 and the communication system 114. Typically, the interface 1022 is a master interface configured to forward a given (read or write) request from the microprocessor 1020 to the communication system 114, and forward an optional response from the communication system 114 to the microprocessor 1020. However, the communication interface 1022 may also comprise a slave interface. For example, in this way, a first microprocessor 1020 may send a request to a second microprocessor 1020 (via the communication interface 1022 of the first microprocessor, the communication system 114 and the communication interface 1022 of the second microprocessor).

Generally, each processing core $102_1, \ldots, 102_n$ may also comprise further local resources, such as one or more local memories 1026, usually identified as Tightly Coupled Memory (TCM).

As mentioned before, typically the processing cores $102_1, \ldots, 102_n$ are arranged to exchange data with a non-volatile memory 104 and/or a volatile memory 104b. In a multi-core processing system 10, often these memories are system memories, i.e., shared for the processing cores $102_1, \ldots, 102_n$. As mentioned before, each processing core $102_1, \ldots, 102_n$ may, however, comprise one or more additional local memories 1026.

For example, as shown in FIG. 3, the processing system 10 may comprise one or more memory controllers 100 configured to connect at least one non-volatile memory 104 and at least one volatile memory 104b to the communication system 114. As mentioned before, one or more of the memories 104 and/or 104b may be integrated in the integrated circuit of the processing system 10 or connected externally to the integrated circuit.

As mentioned before, the processing system 10 may comprise one or more resources 106, such as one or more communication interfaces or co-processors (e.g., a cryptographic co-processor). The resources 106 are usually connected to the communication system 114 via a respective communication interface (i) 1062. In general, the communication interface 1062 comprises at least a slave interface. For example, in this way, a processing core 102 may send a request to a resource 106 and the resource returns given data. Generally, one or more of the communication interfaces 1062 may also comprise a respective master interface. For example, such a master interface may be useful in case the resource has to start a communication in order to exchange data via (read and/or write) request with another circuit connected to the communication system 114, such as a resource 106 or a processing core 102. For example, for this purpose, the communication system 114 may indeed comprise an Advanced Microcontroller Bus Architecture (AMBA) High-performance Bus (AHB), and an Advanced Peripheral Bus (APB) used to connect the resources/peripherals 106 to the AMBA AHB bus.

Often such processing systems 10 comprise also one or more Direct Memory Access (DMA) controllers 110. For example, as shown in FIG. 3, a DMA controller 110 may be used to directly exchange data with a memory, e.g., the memory 104b, based on requests received from a resource 106. For example, in this way, a communication interface IF may directly read data (via the DMA controller 110) from the memory 104b and transmit these data, without having to exchange further data with a processing unit 102. Generally, a DMA controller 110 may communicate with the memory or memories via the communication system 114 or via one or more dedicated communication channels.

Often, such processing circuits comprise also one or more circuits configured to verify an error correction code (ECC).

For example, FIGS. 4 and FIG. 5 show a generic processing system 10 comprising a master device 40 and a slave device 42, wherein the master device 40 and the slave device 42 use a conventional ECC protection scheme.

Specifically, in FIG. 4 the master circuit 40 transmits data DATA to the slave device 42. Specifically, the slave device 42 receives the data bits DATA and additional error correction code bits ECC generated by an error correction code generation circuit (ECCG) 44 configured to generate the bits ECC as a function of the data bits DATA.

For example, in various embodiments, the master device 40 may be a processing core 102, in particular a microprocessor 1020, or a DMA controller 110. Conversely, the slave device 42 may be a memory such as a non-volatile memory 104 or a volatile memory, e.g., a RAM memory 104b or a TCM 1026. For example, the error correction code generation circuit 44 may be integrated in the memory controller of the memory 42. For a general description of these circuits, and a respective processing system 10, reference may be made to the previous description of FIGS. 1 to 3. For example, the microprocessor 1020 or DMA controller 110 (master device 40) may send a write request comprising the data DATA via the communication system 114 to the memory controller 100, and/or via a dedicated communication system within the processing core 102 to a memory controller of the TCM 1026. The memory controller may then calculate via the respective error correction code generation circuit 44 the bits ECC and write the data bits DATA and the bits ECC to the memory, e.g., to a memory address included in the write request.

Conversely, in FIG. 5 the master circuit 40 receives given data DATA from the slave device 42. Specifically, the slave device 42 provides the data bits DATA and the additional error correction code bits ECC.

For example, for this purpose, the microprocessor 1020 or DMA controller 110 (master device 40) may send a read request via the communication system 114 to the memory controller 100, and/or via a dedicated communication system within the processing core 102 to a memory controller of the TCM 1026. The memory controller may then read the data bits DATA and the bits ECC from the memory, e.g., from a memory address included in the read request, and transmit the data bits DATA to the microprocessor 1020 or DMA controller 110.

However, as shown in FIG. 5, in this case, an error detection circuit (ED) 46 is configured to verify the bits DATA and ECC, and possibly generate one or more error signals ERR. For example, the one or more error signals ERR may be provided to the master circuit 40 and/or a fault collection and error management circuit (Err) 120.

For example, the error detection circuit 46 may be integrated in the memory controller 100. Specifically, in case of a simple error detection circuit 46, this circuit just verifies the correctness of the bits DATA and ECC. However, the error detection circuit 46 may also provide information concerning the position of the error, which thus may be used by an error correction circuit to correct errors in the data bits DATA. Generally, the error correction circuit may be integrated with the error detection circuit in an error detection and correction circuit 46, or the error correction circuit may be a separate circuit. Accordingly, the circuit 46 may indeed provide corrected data bits DATA to the master device 40.

Moreover, such ECC schemes may also be used for the communications exchanged via the communication system 114. For example, a bus master, such as the interface 1022 may add ECC bits to a request sent over the communication system 1144. Accordingly, the receiving slave circuit, such as the slave interface 1062, may verify the ECC bits in order to detect errors in the transmitted request. Generally, such ECC bits may be verified via a respective error detection circuit for each of the address, data and control information of a request, or a combination of these information.

Generally, the number K of ECC bits depends on the number N of DATA bits and the ECC scheme, e.g., how many bits can be repaired. Thus, depending on the complexity of the implemented error correction code (ECC), the circuit 46 is able to detect up to a given number of flipped bits and eventually repair them. For example, in the field of micro-controllers adapted to be used in the automotive market, the adopted ECC scheme is usually able to detect up to two erroneous bits and repair one erroneous bit, using a so called Single-Error Correct (SEC) Double-Error Detect (DED) Code. For a general description of error detection and optionally correction codes, reference can be made to the corresponding webpage "Error detection and correction" of Wikipedia, e.g., the version of May 6, 2021, the content thereof being incorporated herein by reference. A possible implementation of a SECDED code is described in Application Note XAPP383 "Single Error Correction and Double Error Detection (SECDED) with CoolRunner-II™ CPLDs", v1.1, Aug. 1, 2003 (incorporated herein by reference). Another possible error detection and correction circuit using a SECDED code is disclosed in U.S. Pat. No. 8,381,083 B2 (incorporated herein by reference). This document also discloses that the bits ECC may be calculated also for other data, e.g., for both the data DATA and the respective address.

FIG. 6 shows in this respect an embodiment of error detection circuit 46 adapted to be used in a SECDED scheme, e.g., as used in an ARM Cortex R52 microcontroller.

Specifically, in the embodiment considered, the error detection circuit 46 comprises a syndrome calculation circuit 460 configured to: receive the data bits DATA and ECC bits; calculate the ECC bits for the received data bits DATA; and compare the calculated ECC bits with the received ECC bits.

In case of an error correct code, the result of this comparison, called syndrome SYN, is indicative of the position of the incorrect bit in case of a single bit error. Accordingly, the syndrome SYN corresponds to a bit sequence having K bits. Specifically, in case the syndrome SYN is different from a bit sequence of K bits set to zero, i.e., different from the value 0, an error is detected. For example, this is schematically shown in FIG. 6, where a logic gate 464, such as a logic OR gate, is used to generate an error signal $ERR_1$ as a function of the syndrome SYN, i.e., the error signal $ERR_1$ is asserted when at least one of the bits of the syndrome SYN is asserted.

Generally, the specific implementation of the error detection circuit 46 may depend on the used ECC scheme. For example, in case of a SEC code, the syndrome calculation circuit 460 may often be unable to detect double-bit errors. In fact, the error signal $ERR_1$ will be asserted both for a single bit error and a double-bit error. Accordingly, in various embodiments, the error correction code verification circuit 46 may also comprise a circuit (SBE) 462 configured to specifically detect single bit errors. For example, in the simplest case, the single bit error detection circuit 462 may verify an even or odd parity, thereby generating a signal SB indicating that a single bit error occurred. For example, in this case, the bits ECC may comprise one or more dedicated parity bits which may also not be provided to the syndrome calculation circuit 460.

In this case, such single bit error detection circuit 462 may be unable to distinguish between correct data and double bit-errors. Thus, by combining the error signal $ERR_1$ (indicating a single-bit error or double-bit error) and the signal SB (indicating a single bit error), it is possible to generate via a combinational logic circuit a signal $ERR_2$ indicating that a double-bit error occurred, e.g., by asserting the error signal $ERR_2$ when the error signal $ERR_1$ is asserted and the signal SB is de-asserted. For example, in the embodiment considered, the combinational logic circuit comprises an inverter 468 and a logic AND gate 470.

Accordingly, the error detection circuit 46 may be configured to use the syndrome SYN and the bit SB to generate a single-bit error signature SIG having N+K bits. For example, in the embodiment considered, this operation is implemented in the single bit error detection circuit 462. Specifically, in case of a single-bit error, i.e., the signal SB is asserted, the circuit 46/462 is configured to assert the bit of the signal SIG corresponding to the position indicated by the syndrome SYN, while the other bits of the signal SIG are de-asserted.

In case the circuit 462 does not directly provide the signal SB, a corresponding signal SB may thus be generated via a logic combination of the bits of the signal SIG, e.g., via a logic OR gate 466, because at most only one of the bits of the signal SIG should be asserted.

Generally, also other ECC schemes may be used in order to generate the bit-flip signature SIG, which could also indicate that more than one bit should be flipped, e.g., in case of a Double-Error Correct code. Similarly, in this case, the error signals $ERR_1$ and $ERR_2$ could indicate in general that an error occurred (error signals $ERR_1$) and optionally that the error is correctable or not (error signals $ERR_2$).

In fact, these solutions have in common that the error detection circuit 46 is configured to compare the syndrome SYN with a plurality of reference syndromes, wherein each reference syndrome corresponds to a given bit flip signature SIG. Thus, in case the syndrome SYN corresponds to a reference syndrome, the error detection circuit 46 may assert the respective bits of the error signature SIG. For example, in case of a SECDED code, the error detection circuit would use N+K reference syndromes, each corresponding to a respective single bit error. For example, the verification of the reference signatures and the setting of the signature SIG (and the error signals) may be implemented via a combinational logic circuit. In this respect, by using a suitable SECDED ECC code, each reference syndrome associated with a single bit error may also have a unique pattern compared to double bit flip errors.

Accordingly, in general, the error detection circuit 46 be configured to:
not signal an error (e.g., by de-asserting both error signals $ERR_1$ and $ERR_2$) when the bits of the syndrome SYN are all de-asserted;
signal a correctable error (e.g., by asserting the error signal $ERR_1$ and de-asserting the error signal $ERR_2$) when the syndrome SYN corresponds to one of the (e.g., single bit error) reference syndromes, also asserting the respective bits of the bit-flip signature SIG; and
signal an uncorrectable error (e.g., by asserting the error signal $ERR_1$ and the error signal $ERR_2$) when at least one bit of the syndrome SYN is asserted and the syndrome SYN does not correspond to any of the reference syndromes.

Accordingly, in various embodiments, the signals $ERR_1$, $ERR_2$ and SIG may be provided to an error correction circuit, e.g., implemented in the memory controller, which thus may:
in case no error is signaled (e.g., the signal $ERR_1$ is de-asserted and the signal $ERR_2$ is de-asserted) provide the original data DATA to the requesting master device, e.g., by sending the data DATA to the communication system 114;

in case of a correctable bit error (e.g., the signal $ERR_1$ is asserted and the signal $ERR_2$ is de-asserted) flip the logic level of the respective bit(s), in particular in case of a data bit DATA, as indicated by the signature SIG, and provide the corrected data DATA to the requesting master device 40; and in case of an uncorrectable bit error (e.g., the signal $ERR_1$ is asserted and the signal $ERR_2$ is asserted), signal an error to the requesting master device and/or a fault collection and error management circuit 120.

Accordingly, error detection and correction circuits may be complex combinational logic circuits, which introduce additional propagation delays in order to verify the bits DATA and ECC. Those of skill in the art will appreciate that these delays in the path between the master circuit 40 and the slave circuit 42 limit the clock frequency in the processing system 10, e.g., the clock frequency of the processing core 102 in case of a TCM 102b, or at least the clock frequency of the communication system 114 in case of communications with the memory controller 100.

In this respect, two common solutions may be used in order to increase the clock frequency of the processing system 10:

use faster circuits, such as a faster memory; and/or use a pipelined architecture, wherein the memory read access is performed in a first clock cycle and the ECC verification is performed in a second (wait) state.

However, the first solution usually implies a greater area and power consumption, while the second solution results in lower global system performances, in particular in case of TCM memories 102b, which should provide the read/corrected data DATA within one clock cycle.

SUMMARY

In view of the above, various embodiments of the present disclosure provide solutions for improving the performance of processing systems comprising one or more ECC error detection and correction circuits.

One or more embodiments concern a processing system. Embodiments moreover concern a related integrated circuit, device and method.

As mentioned before, various embodiments of the present disclosure relate to a processing system, e.g., integrated in an integrated circuit. The processing system comprises a master circuit, a slave circuit and an error detection and correction circuit. For example, the master circuit may be a microprocessor and the slave circuit may be a Tightly Coupled Memory. For example, the microprocessor may be an ARM based microprocessor, such as an ARM Cortex-M7 processor.

In various embodiments, the master circuit is configured to generate a read request comprising an address, wherein the master circuit is configured to signal the read request by asserting a first control signal, such as a request signal. The master circuit is also configured to receive N (first) data bits, a second control signal and a third control signal. Specifically, the master circuit is configured to determine the logic level of the second control signal, such as a wait signal, wherein a respective first logic level indicates that the N (first) data bits contain valid data and a respective second logic level indicates that the N (first) data bits do not contain valid data. Moreover, the master circuit is configured to determine the logic level of the third control signal, such as a retry signal, wherein a respective first logic level indicates that the read request should be repeated, and a respective second logic level indicates that the read request should not be repeated. Accordingly, in response to determining that the second control signal has the respective first logic level, the master circuit reads the N (first) data bits and, in response to determining that the third control signal has the respective first logic level, the master circuit repeats the read request.

In various embodiments, the slave circuit is configured to receive the read request and, in response to determining that the first control signal is asserted, provide N (second) data bits and K ECC bits associated with the address included in the read request. Generally, the address associated with the read request may correspond to the address included in the read request, or the processing system may comprise an address decoder configured to determine the address associated with the read request by mapping the address included in the read request.

In various embodiments, the error detection and correction circuit is configured to receive the read request from the master circuit, and the N (second) data bits and the K ECC bits from the slave circuit. Moreover, the error detection and correction circuit is configured to provide the N (first) data bits, the second control signal and the third control signal to the master circuit. Specifically, in various embodiments, the error detection and correction circuit comprises a multiplexer configured to provide the N (first) data bits to the master circuit by selecting the N (second) data bits received from the slave circuit when a selection signal has a respective first logic level and N further (third/corrected) data bits generated by the error detection and correction circuit when the selection signal has a respective second logic level. Specifically, in various embodiments, the error detection and correction circuit is configured to generate the N further (third/corrected) data bits by processing the N (second) data bits and the K ECC bits received from the slave circuit in order to determine whether the N (second) data bits do not comprise errors or comprise one or more correctable bit-errors. In response to determining that the N (second) data bits received from the slave circuit comprise one or more correctable bit-errors, the error detection and correction circuit asserts an error signal and generates a bit-flip signature having the bits asserted in the positions of the one or more correctable bit-errors. In this case, the error detection and correction circuit may generate the N further (third/corrected) data bits by inverting the bits of the N (second) data bits received from the slave circuit at the positions for which the bits of the bit-flip signature are asserted.

Specifically, in various embodiments, the error detection and correction circuit comprises a pipelined architecture, whereby the N further (third/corrected) data bits are generated with a delay of one clock cycle with respect to the respective N (second) data bits provided by the slave circuit. For example, the pipelined architecture of the error detection and correction circuit may be implemented via a register configured to store the N (second) data bits and the K ECC bits provided by the slave circuit, or a register configured to store the error signal and the bit-flip signature.

As will be described in greater detail in the following, in various embodiments, the error detection and correction circuit comprises a memory and a control circuit comprising a first sub circuit and a second subcircuit. The first subcircuit is configured to monitor the first control signal in order to detect a read request. In response to detecting a read request, the first subcircuit determines an address associated with the read request and verifies whether the address associated with the read request is stored to the memory.

In response to determining that the address associated with the read request is not stored to the memory, the first subcircuit sets the logic level of the selection signal to the respective first logic level, whereby the multiplexer provides the N (second) data bits received from the slave circuit. Moreover, the first subcircuit sets the logic level of the second control signal to the respective first logic level indicating that the N (first) data bits provided to the master circuit contain valid data.

Conversely, in response to determining that the address associated with the read request is stored to the memory, the first subcircuit sets the logic level of the second control signal for a clock cycle to the respective second logic level indicating that the N first data bits do not contain valid data. Moreover, the first subcircuit sets the logic level of the selection signal to the respective second logic level, whereby the multiplexer provides the N further (third/corrected) data bits to the master circuit. However, in this case, the first subcircuit sets the logic level of the second control signal only for the following clock cycle to the respective first logic level indicating that the N (first) data bits contain valid data, whereby the master circuit samples the N (first) data bits contain valid data just at the next clock cycle.

Conversely, the second subcircuit manages the storing of addresses to the memory. Specifically, in various embodiments, the second subcircuit is configured to monitor the error signal. In response to determining that the error signal is asserted, the second subcircuit verifies whether the address associated with the read request is stored to the memory.

Specifically, in response to determining that the address associated with the read request is not stored to the memory, the second subcircuit stores the address associated with the read request to the memory. Moreover, the second subcircuit sets the logic level of the third control signal to the respective first logic level indicating that the read request should be repeated. For example, the memory may have a given number of memory slots. In this case, the second subcircuit may manage the memory as a ring memory and store the address associated with the read request to a next memory slot of the ring memory. Alternatively, the second subcircuit may associate with each univocal address stored to a given memory slot respective further data, the further data specifying a number of occurrence and/or a last access time.

Conversely, in response to determining that the address associated with the read request is stored to the memory, the second subcircuit sets the logic level of the third control signal to the respective second logic level indicating that the read request should not be repeated.

In various embodiments, the error detection and correction circuit may also be configured to process the N (second) data bits and the K ECC bits received from the slave circuit in order to determine whether the N second data bits comprise an uncorrectable bit-error, and in response to determining that the N second data bits comprise an uncorrectable bit-errors, asserting a further error signal. In this case, in response to determining that the further error signal is asserted, the second subcircuit may also set the logic level of the third control signal to the respective first logic level indicating that the read request should be repeated.

Accordingly, in various embodiments, when the processing system generates via the master circuit a first read request including a given address to data comprising errors, the slave circuit provides in a first clock cycle the N (second) data bits and K Error ECC bits associated with the given address. Moreover, the first subcircuit determines that the address associated with the first read request is not stored to the memory, sets the logic level of the selection signal to the respective first logic level, whereby the multiplexer provides the N (second) data bits received from the slave circuit, and sets the logic level of the second control signal to the respective first logic level indicating that the N (first) data bits provided to the master circuit contain valid data.

However, in a following second clock cycle, the second subcircuit determines then that the error signal is asserted and the address associated with the read request is not stored to the memory, and accordingly stores the address associated with the read request to the memory and sets the logic level of the third control signal to the respective first logic level indicating that the read request should be repeated.

Accordingly, in response to the third control signal being set to the respective first logic level, the processing system generates via the master circuit a second read request including the given address, whereby the slave circuit provides in a third clock cycle the N (second) data bits and K Error ECC bits associated with the given address. Moreover, the first subcircuit determines that the address associated with the second read request is stored to the memory and sets the logic level of the second control signal to the respective second logic level indicating that the N first data bits do not contain valid data. Accordingly, in a following fourth clock cycle, the first subcircuit sets the logic level of the selection signal to the respective second logic level, whereby the multiplexer provides the N further (third/corrected) data bits, and sets the logic level of the second control signal to the respective first logic level indicating that the N first data bits contain valid data.

BRIEF DESCRIPTION OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In the following FIGS. 7 to 11 parts, elements or components which have already been described with reference to FIGS. 1 to 6 are denoted by the same references previously used in such Figure; the description of such previously described elements will not be repeated in the following in order not to overburden the present detailed description.

As mentioned before, various embodiments of the present disclosure relate to solutions for improving the performance of a processing system 10a comprising an ECC error detection and correction circuit.

Figure 1:
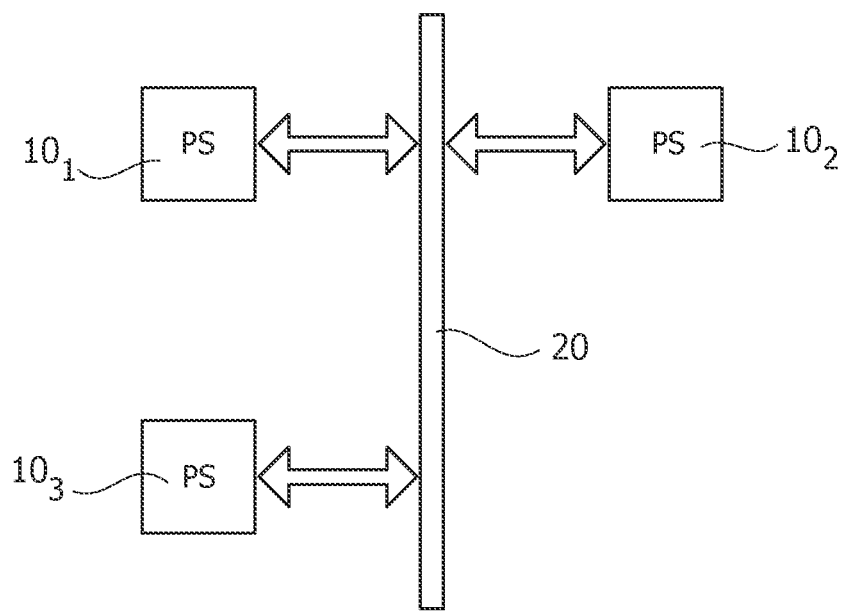
FIG. 1 shows an example of an electronic system comprising a plurality of processing systems.
Figure 2:
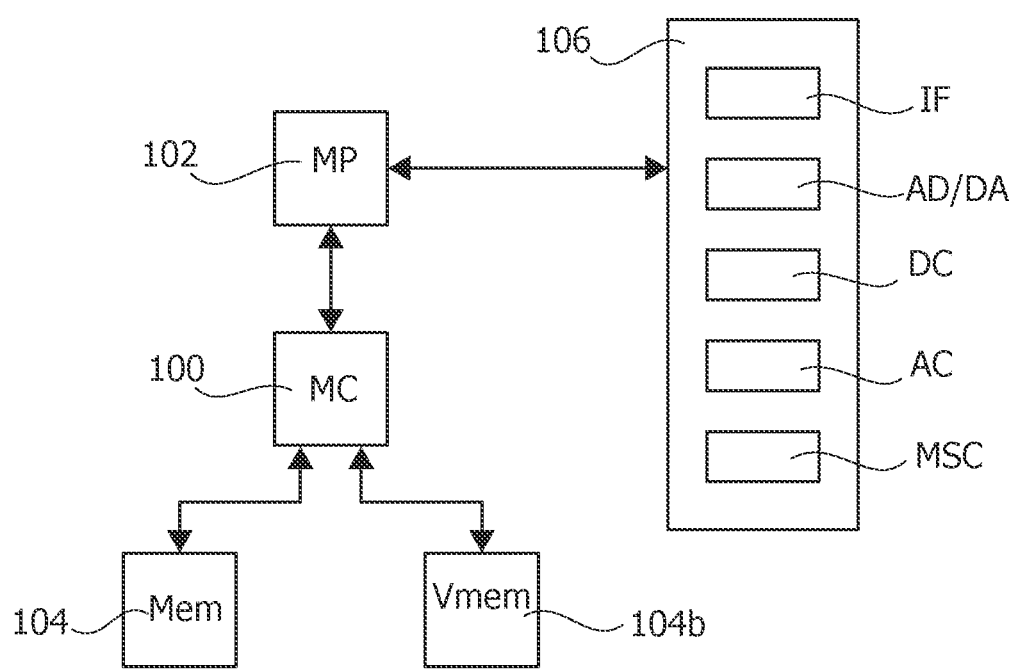
FIGS. 2 and 3 show examples of processing systems.
Figure 3:
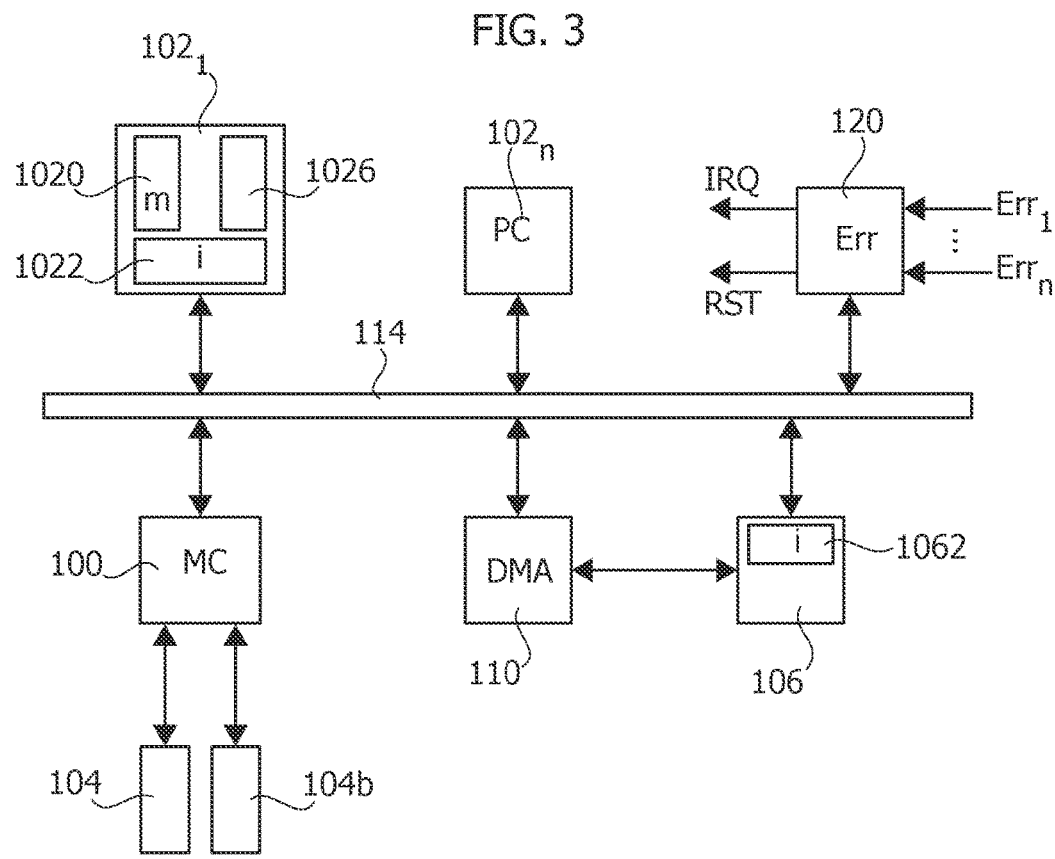
Figure 4:
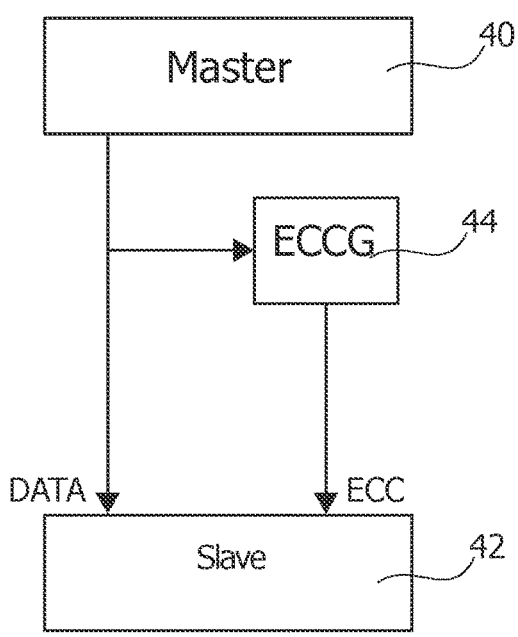
FIG. 4 shows an example of a processing system configured to generate ECC bits as a function of data bits.
Figure 5:
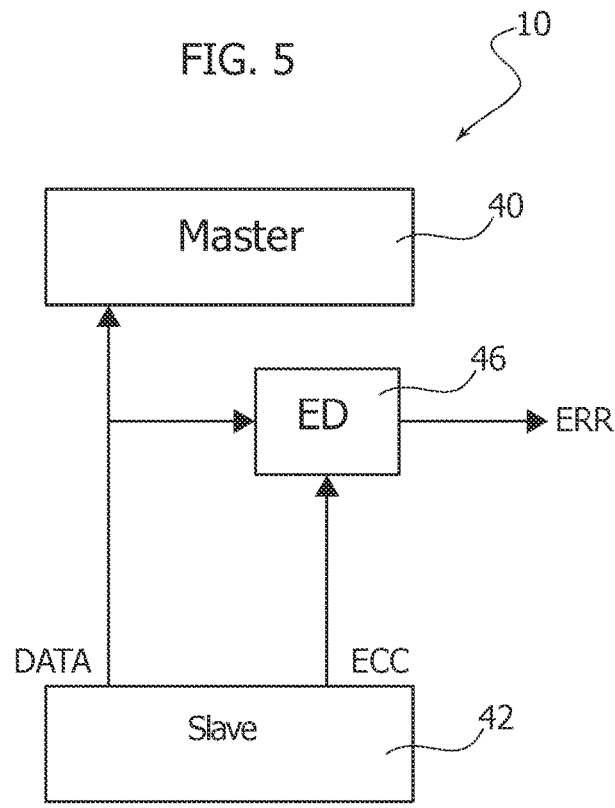
FIG. 5 show an example of a processing system configured to use ECC bits in order to detect and optionally correct errors in data bits.
Figure 6:
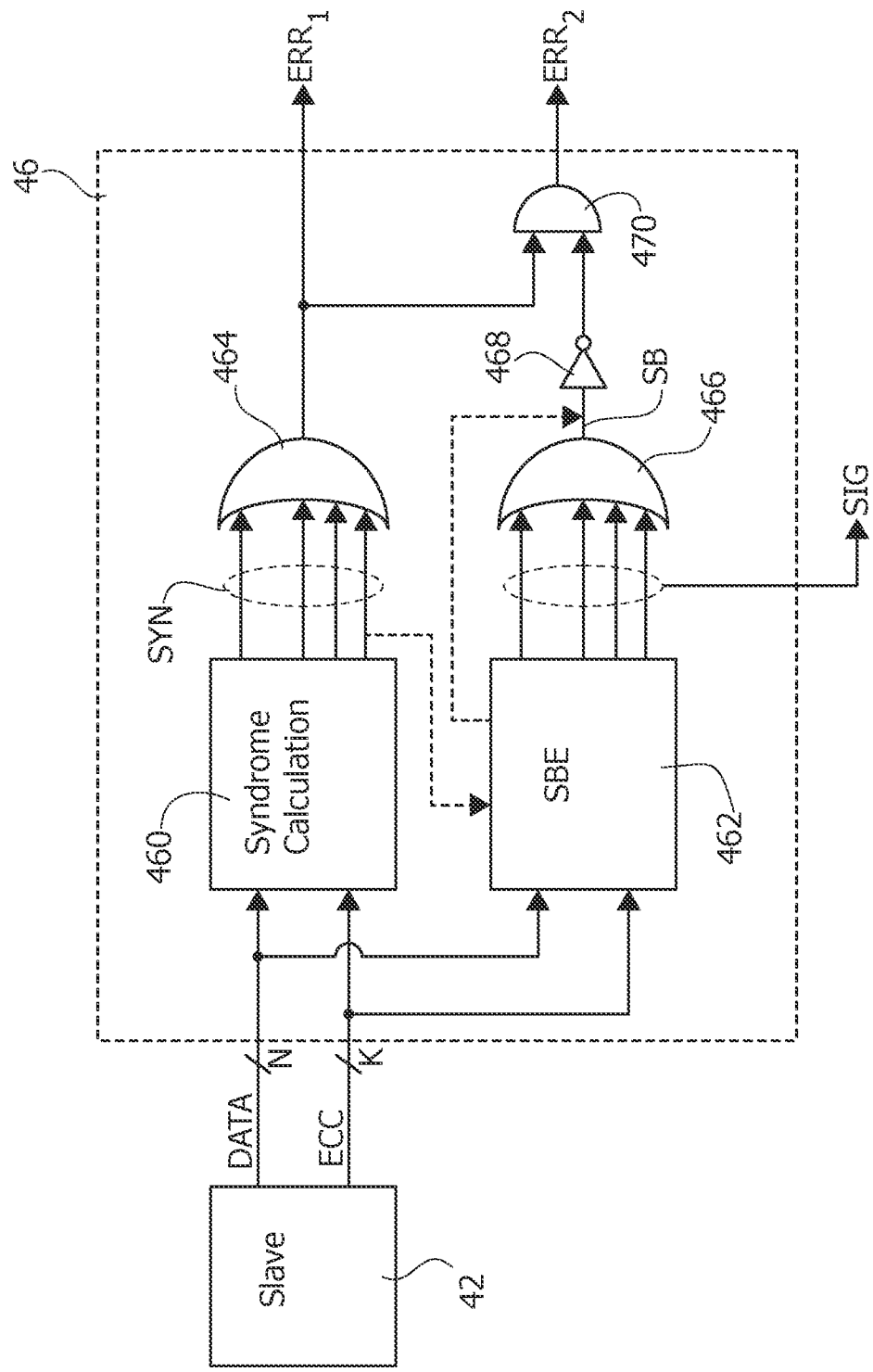
FIG. 6 shows an example of an error detection circuit adapted to be used in the processing system of FIG. 5.
Figure 7:
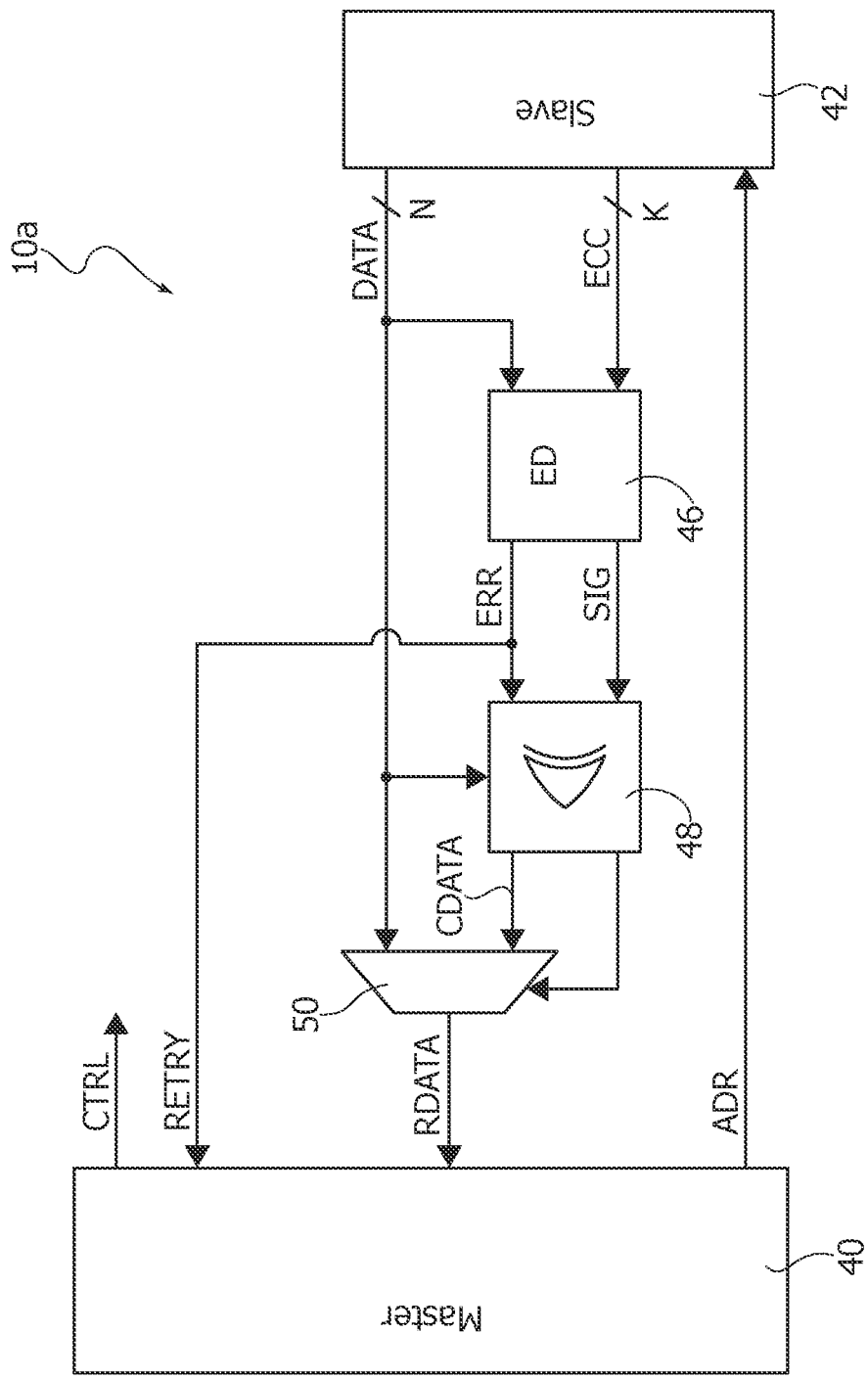
FIG. 7 shows a first example of an error detection and correction circuit.

FIG. 7 shows an example of a processing system 10a comprising an error detection circuit (ED) 46 and an error correction circuit 48.

Generally, also in this case, a master circuit 40 receives given data DATA from a slave device 42. Specifically, the slave device 42 provides the data bits DATA and the additional error correction code bits ECC.

For example, the master circuit 40, such as a microprocessor 1020 or DMA controller 110, may be configured to send a read request comprising an address ADR. As schematically shown in FIG. 7, in order to generate the read request, the master device 40 may also generate one or more control signals CTRL. For example, the control signal CTRL may indicate that a request is performed, e.g., by using a request signal, and optionally whether a read or write request is performed, e.g., by using a read/write signal.

For example, the slave device 42 may be: an internal circuit of the processing core 102 connected to the microprocessor 1020 via a dedicated communication system of the processing core 102, such as a TCM 1026; or a circuit connected to the communication system 114, such as a memory controller 100 or a resource/peripheral 106.

Accordingly, in various embodiments, the read request may be transmitted, e.g., via the communication system 114 to the memory controller 100, and/or via a dedicated communication system within the processing core 102 to a TCM 1026.

Accordingly, the slave device 42 associated with the address ADR receives the read request, obtains respective data DATA associated with the address ADR and provides the data DATA to the master circuit 40. For example, in case of a memory (e.g., 104, 104b and/or 1026), the memory may return the data stored to a memory location associated with the address ADR. As mentioned before, the slave device 42 does not only provide the data bits DATA, but also additional ECC bits. For example, as described in the foregoing, in case of a memory, the ECC bits may be stored together with the respective data bits DATA.

Specifically, in the embodiment considered, the processing system 10a comprises also an error detection circuit 46 configured to verify the bits DATA and ECC. Specifically, for this purpose, the error detection circuit 46 is configured to: receive the data bits DATA and ECC bits from the slave circuit 42; calculate ECC bits for the received data bits DATA; and generate a syndrome SYN by comparing the calculated ECC bits with the received ECC bits.

Moreover, the error detection circuit 46 is configured to generate one or more error signals ERR, wherein the error detection circuit 46 is configured to: not signal an error via the one or more error signals ERR when the bits of the syndrome SYN are all de-asserted; signal a correctable error via the one or more error signals ERR when the syndrome SYN corresponds to one of a plurality of (e.g., single bit error) reference syndromes; and optionally signal an uncorrectable error via the one or more error signals ERR when at least one bit of the syndrome SYN is asserted and the syndrome SYN does not correspond to any of the reference syndromes.

In the embodiment considered, the error detection circuit 46 generates also the bit-flip signature SIG. Accordingly, in case of a correctable error, the error detection circuit 46 may assert the respective bits of the bit-flip signature SIG associated with the detected reference syndrome. For a general description of the circuits 40, 42 and 46 may thus be made reference to the previous description of FIGS. 1 to 6.

In the embodiment considered, the one or more error signals ERR and the signature SIG are provided to an error correction circuit 48. Specifically, the error correction circuit 48 is configured to generate corrected data CDATA (at least) when the one or more error signals ERR signal a correctable error. For example, for this purpose, the error correction circuit 48 may determine the bits of the signature SIG, which are asserted, and generate the signal CDATA by inverting the respective bits of the data signal DATA. Accordingly, the error correction circuit 48 may be implemented, e.g., via N logic XOR gates, wherein each XOR gate receives at input a respective bit of the signal DATA and the signature SIG, and provides at output a respective bit of the signal CDATA.

Accordingly, as schematically shown via a multiplexer 50, which may also be implemented directly within the error correction circuit 48, the error correction and detection circuit 46/48 may provide to the master circuit 40 a signal RDATA corresponding to: in case the one or more error signals ERR do not signal an error, the original data DATA provided by the slave circuit 42; or in case the one or more error signals ERR signal a correctable error, the corrected data CDATA generated by the error correction circuit 48.

In various embodiments, one or more of the error signals ERR may also be provided to the master circuit 40. Specifically, in various embodiment, the master circuit 40 is configured to receive a signal RETRY which indicates whether the read request failed, i.e., the error detection circuit 46 is configured to assert the signal RETRY when the error detection circuit 46 detects an uncorrectable error, e.g., a double-bit error in a SECDED scheme. Accordingly, in various embodiments, the master circuit 40 may be configured to repeat the read request, when the signal RETRY is asserted, e.g., when the error detection circuit 46 detects an uncorrectable error.

Accordingly, as described in the foregoing, the error detection and correction circuit 46/48 may be implemented via one or more combinational logic circuits. However, such combinational logic circuits introduce an additional maximum propagation delay in the path between the slave circuit 42 and the master circuit 40, which limits the maximum clock frequency, which can be used by the master circuit 40 in order to sample the data signal RDATA.

Figure 8:
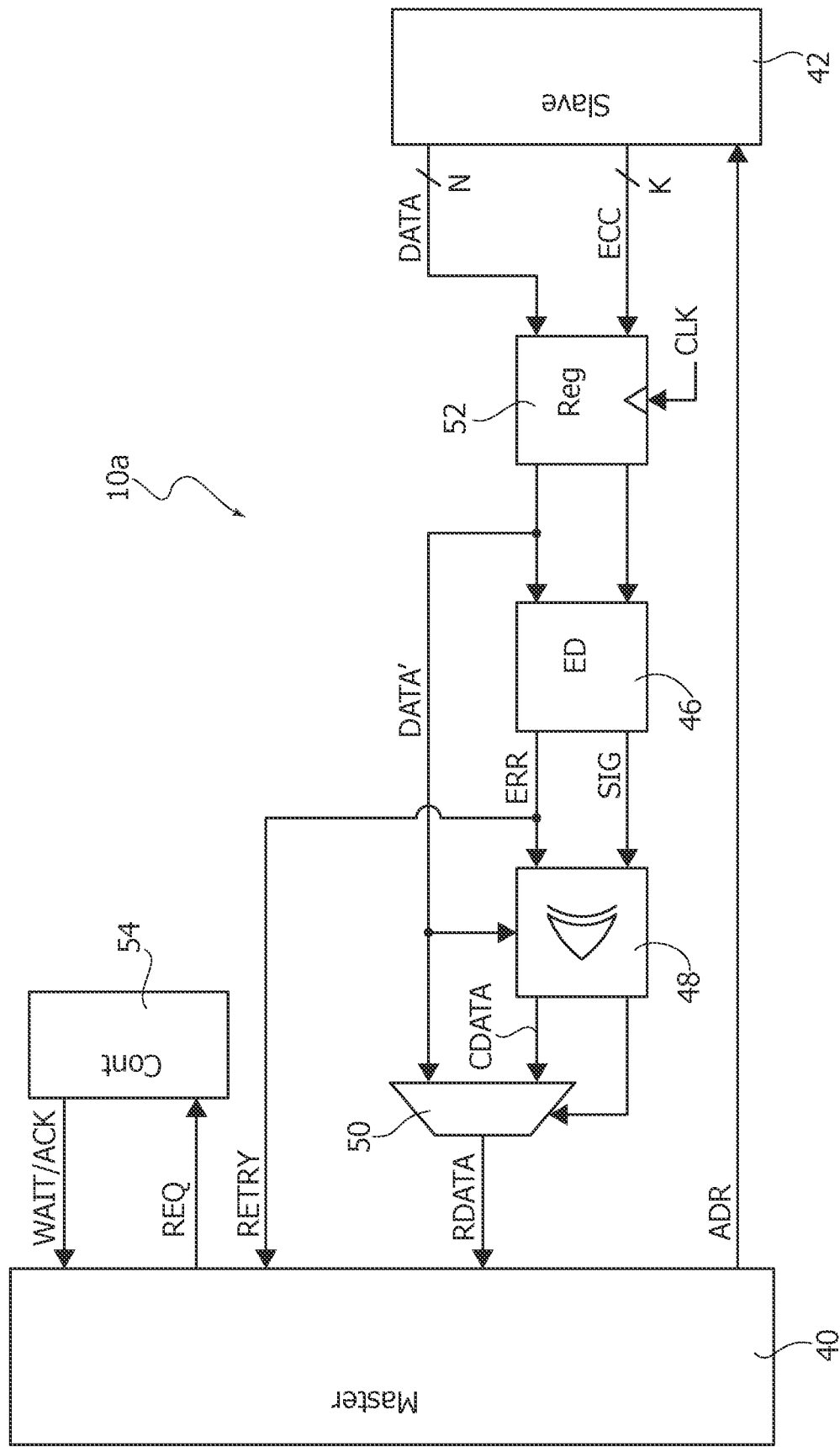
FIG. 8 shows a second example of an error detection and correction circuit.

FIG. 8 show a modified example, wherein a pipelined architecture is used in order to split the data read operation from the ECC verification operation.

Specifically, in the embodiment considered, the processing system 10a comprises a register (Reg) 52 configured to store the bits DATA and ECC provided by the slave circuit 42 in response to a clock signal CLK, such as the clock signal of the master circuit 40.

Accordingly, the error detection circuit 46 may operate with the data bits stored to the register 52, and similarly, the master circuit 40 may receive via the signal RDATA either the stored data DATA provided by the register 52, indicated in the following as data DATA', or the corrected data CDATA provided by the error correction circuit.

Accordingly, in the embodiment considered, the master circuit 40 is configured to receive the data RDATA after two clock cycles (or even more clock cycles, in case other clock cycles are required to transmit the signals DATA and ECC from the slave circuit 42 to the register 52 and/or the signal RDATA from the error detection and correction circuit 46/48 to the master circuit 40).

For example, in order to manage the data transfer, the master circuit 40 may generate the read request, as signaled, e.g., via a request signal REQ, and a control circuit (Cont) 54 associated with the error detection and correction circuit 46/48 may generate a control signal indicating when the data signal RDATA is valid. Generally, the control signal may be either: a wait signal WAIT, which is asserted in order to indicate that the signal DATA' does not contain valid data for the current clock cycle; or an acknowledge signal ACK, which is asserted in order to indicate that the signal DATA' does contain valid data for the current clock cycle.

Accordingly, in the embodiment, the master circuit 40 is configured to read the signal DATA' in response to a clock signal, e.g., the clock signal CLK, as a function of the signal WAIT and/or ACK. For example, the master circuit 40 may store the bits of the signal DATA' to an internal register.

Thus, while this solution reduces the propagation delay, an additional clock cycle is required until the master circuit 40 may read the data DATA'.

Figure 9:
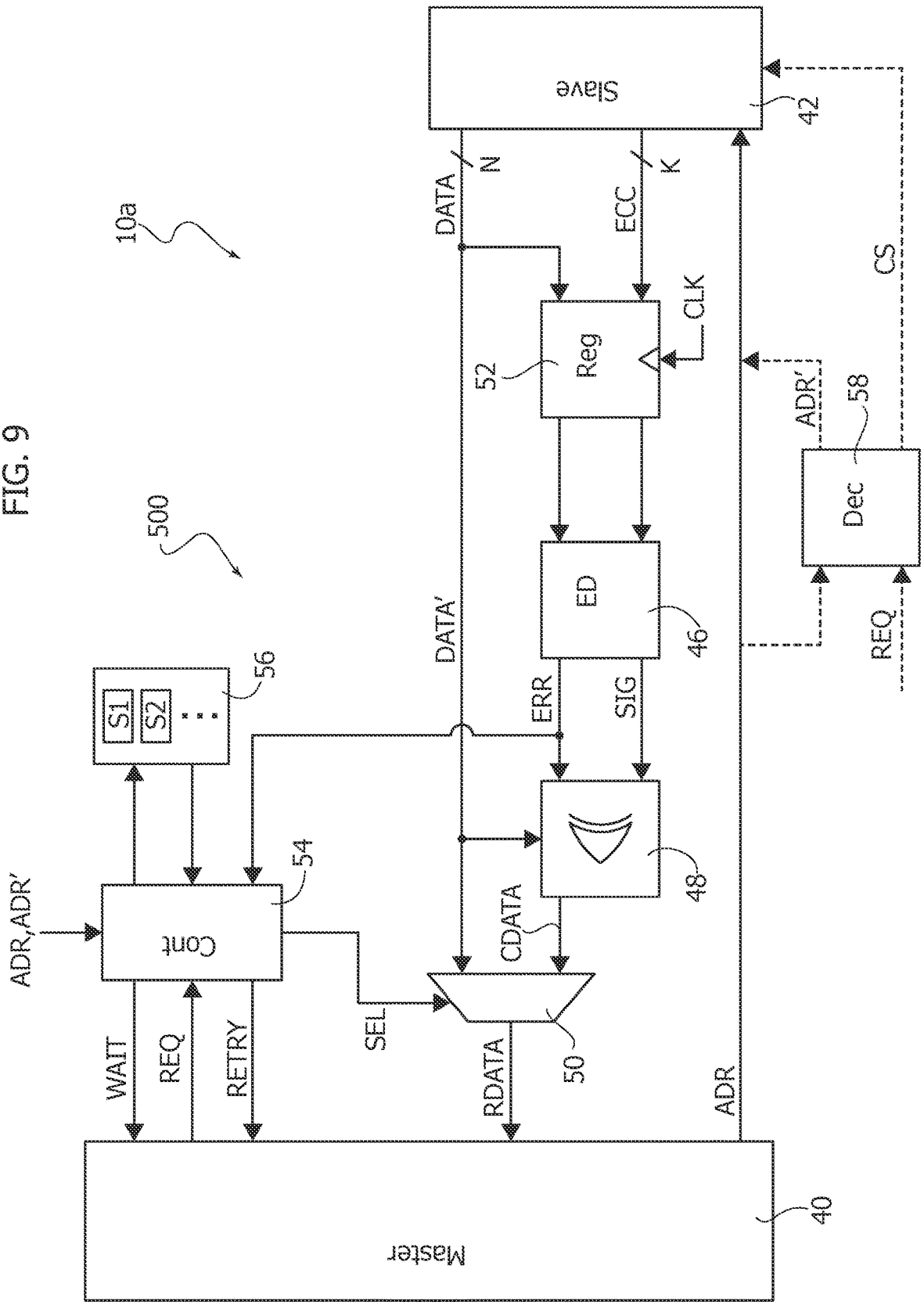
FIG. 9 shows an embodiment of an error detection and correction circuit according to the present disclosure.

FIG. 9 shows an embodiment of a processing system 10a according to the present disclosure, wherein the processing system 10a comprises again a master circuit 40 and a slave circuit 42.

Specifically, in the embodiment considered, the master circuit 40 is again configured to generate a read request comprising an address ADR, wherein the read request is signaled via one or more control signals, such as the previous mentioned request signal REQ. Moreover, the master circuit 40 is configured to receive a data signal RDATA. In order to correctly manage the read request, the master circuit 40 is again configured to receive a control signal indicating whether the data signal RDATA contains valid data, such as the previous mentioned wait signal WAIT (and/or acknowledge signal ACK), i.e., the master circuit 40 is configured to read the data signal RDATA in response to a clock signal and in response to determining that the control signal WAIT indicates that the data signal RDATA contains valid data. Moreover, in the embodiment considered, the master circuit 40 is configured to receive a control signal indicating whether the read request should be repeated, such as the previous mentioned retry signal RETRY. For example, in various embodiments, the master circuit 40 is a microprocessor 1020. For example, the mentioned control signals are often used by an ARM based microprocessor 1020 in order to interface a TCM memory 1026. For example, reference can be made to the "TCM interface protocol" of current ARM Cortex processors, such as an ARM Cortex-M7 processor as described, e.g., in the "Arm Cortex-M7 Processor Technical Reference Manual", e.g., Revision r1p2, which is incorporated herein by reference for this purpose.

Conversely, in the embodiment considered, the slave circuit 42 is configured to receive an address signal ADR and determine respective data bits DATA and respective bits ECC associated with the data bits DATA. For example, in various embodiments, the slave circuit 42 is a volatile memory, such as a RAM, such as a RAM implementing a TCM memory 1026 of a processing core 102.

Generally, while not shown in FIG. 9, the communication between the master circuit 40 and the slave circuit 42 may be exchanged via any suitable communication system, such as the communication system 114 and/or a dedicated communication system within the processing core 102.

In this respect, as schematically shown in FIG. 9, the address range of the master circuit 40 may indeed be mapped via an address decoder (Dec) 58 to an address range of the slave circuit 42, such as a physical memory address range of a memory. In this case, the address decoder 58 may be configured to receive the read request, in particular the address signal ADR and the control signal indicating the request, such as the signal REQ, and may: generate a mapped/translated address ADR'; and assert a control signal, such as a chip-select signal CS, indicating that the address ADR provided by the master circuit 40 is managed by the slave circuit 42.

Accordingly, in this case, the slave circuit 42 is configured to provide, in response to determining that the signal CS is asserted, the bits DATA and ECC associated with the address ADR'. Generally, the address decoder 58 may be implemented in the respective communication system and/or in the master circuit 40 and/or in the slave circuit 42. For example, in case of TCM memory 1026, the microprocessor 1020 may already provide a physical address ADR of the TCM memory 42 and the request signal REQ may directly correspond to the chip-select) signal CS. Generally, the address mapping operation is purely optional, and the address decoder 58 may also just be configured—similar to a slave communication interface—to assert the control signal CS once having determined that a given address ADR is associated with the slave circuit 42.

In the embodiment considered, the processing system 10a moreover comprises an error detection and correction circuit 500. In this respect, the error detection and correction circuit 500 may be associated with: the master circuit 40, i.e., the error correction detection and correction circuit 500 is configured to verify the data, once the bits DATA and ECC have been transmitted, e.g., in case the bits ECC are generated in order to protect the bits DATA during the data transmission operation; or the slave circuit 42, i.e., the error correction detection and correction circuit 500 is configured to verify the data, before the RDATA are transmitted to the master circuit 40, e.g., in case of a memory with ECC protection.

Specifically, in the embodiment considered, the error detection and correction circuit 500 is configured to receive data bits DATA and ECC bits, and generate corrected data CDATA by processing the bits DATA and ECC according to a given ECC scheme. Moreover, the error detection and correction circuit 500 is configured to generate at least one error signal ERR indicating whether the data bits DATA contain errors. For example, in line with the previous description, the error detection and correction circuit 500 may comprise for this purpose an error detection circuit 46 and an error correction circuit 48.

Moreover, in the embodiment considered, the error detection and correction circuit 500 has a pipelined architecture, i.e., the error detection and correction circuit 500 comprises at least one register 52. For example, in the embodiment considered, the register 52 is configured to receive the bits DATA and ECC from the slave circuit 42 and provided the stored data to the error detection circuit 46. However, instead of storing the bits DATA and ECC, the register 52 may also be used to store other signals used for the error detection and correction function, such as the syndrome SYN or the bit-flip signature SIG. In fact, in various embodiments and as will be described in greater detail in the following, it is sufficient that the content of the corrected data signal CDATA is valid after one clock cycle with respect to the respective bits provided by the slave circuit 42 via the signals DATA and ECC.

In the embodiment considered, the signal DATA provided by the slave circuit 42 and the corrected data signal CDATA are provided (preferably directly) to a multiplexer 50, i.e., the multiplexer 50 is configured to generate the signal RDATA for the master circuit 40 by selecting the signal DATA provided by the slave circuit when a selection signal SEL has a first value and the signal CDATA provided by the error correction circuit 48 when the selection signal SEL has a second value.

Accordingly, compared to the embodiments shown in FIGS. 7 and 8, for a given data signal DATA provided by the slave circuit 42, the signal CDATA will contain valid data just after one further clock cycle.

In the embodiment considered, the error detection and correction circuit 500 comprises thus also a control circuit 54 configured to receive the read request from the master circuit 40, in particular the address ADR (or the mapped address ADR') and the control signal indicating the read request, such as the request signal REQ or the chip-select signal CS, and the one or more error signal ERR from the error detection circuit 46. Moreover, the control circuit 54 is configured to generate as a function of these signals the wait signal WAIT (or similarly an acknowledge signal ACK) and the retry signal RETRY for the master circuit 40, and the selection circuit SEL for the multiplexer 50.

Specifically, in the embodiment considered, the control circuit 54 should be configured to assert the wait signal WAIT (or similarly de-assert an acknowledge ACK) when the one or more error signals ERR indicate an error in the bits DATA and/or ECC, in particular in case of a correctable error, because in this case, the master circuit 40 should read the data CDATA, which is however only valid at the next clock cycle. However, in the embodiment considered, due to the pipelined architecture, also the one or more error signals ERR are possibly only asserted after one clock cycle with respect to the data signal DATA. Accordingly, the error signals ERR cannot be used to directly generate the wait signal WAIT.

Accordingly, in order to correctly manage the generation of the wait signal WAIT (or acknowledge signal ACK), in various embodiments, the control circuit 54 is configured to track addresses ADR (or similarly ADR'), for which the error detection and correction circuit 500 had detected ECC errors in the past. For example, the addresses with errors may be stored to a memory 56, preferably implemented with registers. For example, the memory 56 may comprise a given number of slots, such as 2, 4, 8 or 16 slots, such as slots S1, S2, etc.

Figure 10:
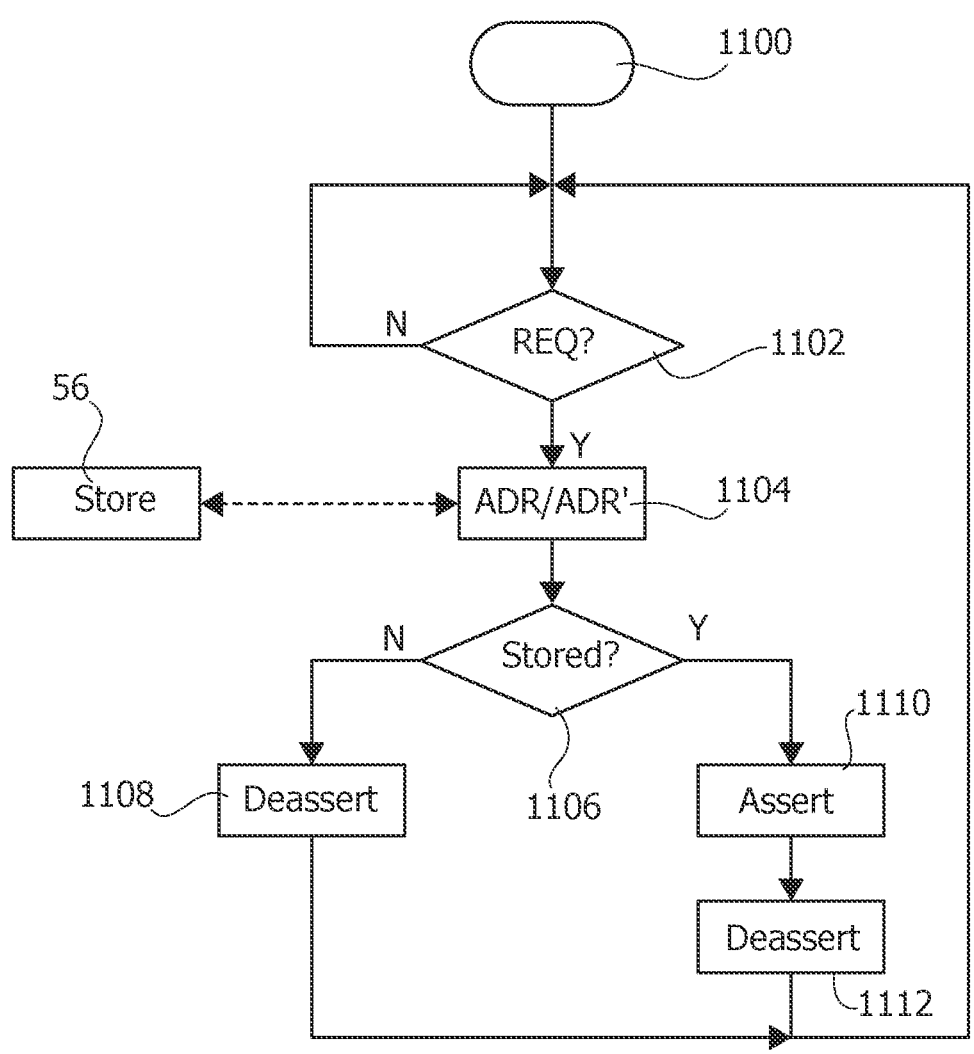
FIG. 10 shows the operation of a first sub-circuit of the error detection and correction circuit of FIG. 9.

FIG. 10 shows an embodiment of the operation of a first sub-circuit of the control circuit 54, which, e.g., may be implemented via a finite state machine, i.e., via a sequential logic circuit.

Specifically, after a start step 1100, which is, e.g., started when the processing system 10*a* is switched on, the control circuit 54 waits at a step 1102 for a read request. For example, the control circuit 54 may be configured to verify at the step 1102 whether the request signal REQ or the chip-select signal CS is asserted for the current clock cycle. In case the control circuit 54 determines that no read request has been received (output "N" of the verification step 1102), the control circuit may thus return to the step 1102.

Conversely, in case the control circuit 54 determines that a read request has been received (output "Y" of the verification step 1102), the control circuit 54 proceeds to a step 1104, where the control circuit 54 obtains the address ADR (or ADR') of the read request and determines whether the obtained address is stored to the memory 56.

The control circuit 54 verifies then at a step 1106 whether the obtained address is stored to the memory 56. Specifically, in case the obtained address is not stored to the memory 56 (output "N" of the verification step 1106), the control circuit 54 proceeds to a step 1108 where the control circuit 54 de-asserts the wait signal WAIT (or asserts the acknowledge signal ACK) and sets the selection signal SEL in order to select the signal DATA provided by the slave circuit 40.

Conversely, in case the obtained address is stored to the memory 56 (output "Y" of the verification step 1106), the control circuit 54 proceeds to a step 1110 where the control circuit 54 asserts the wait signal WAIT (or de-asserts the acknowledge signal ACK). Next, the control circuit 54 proceeds to a step 1112 where the control circuit 54 de-asserts the wait signal WAIT (or asserts the acknowledge signal ACK) at the next clock cycle, thereby signaling to the master circuit 40 the fact that the master circuit 40 should acquire the data RDATA only at the next cycle, which should correspond to the corrected data CDATA. Accordingly, at least at the step 1112, the control circuit 54 sets the selection signal SEL in order to select the signal CDATA provided by the error correction circuit 48. Generally, the value of the selection signal SEL at the step 1110 is not relevant, because the master circuit 40 should not read the signal RDATA at the step 1110.

Accordingly, at the end of the steps 1108 and 1112, the control circuit 54 may return to the step 1102 for processing a next read request.

Accordingly, in the embodiment considered, read requests to addresses ADR (or ADR') usually not comprising errors may be processed in one clock cycle by directly providing the data DATA to the master circuit. Conversely, read requests to addresses ADR (or ADR') usually comprising errors are processed in two clock cycles by providing the data CDATA to the master circuit. Generally, even though the data CDATA refer to corrected data, indeed these data may also correspond to the original data DATA in case the error detection circuit 46 does not detect errors in the bits DATA and ECC, i.e., in case the bit-flip signature SIG has all bits set to "0".

However, the operations shown in FIG. 10 do not handle the function of adding a new address to the memory 56 in case an error is detected.

Figure 11:
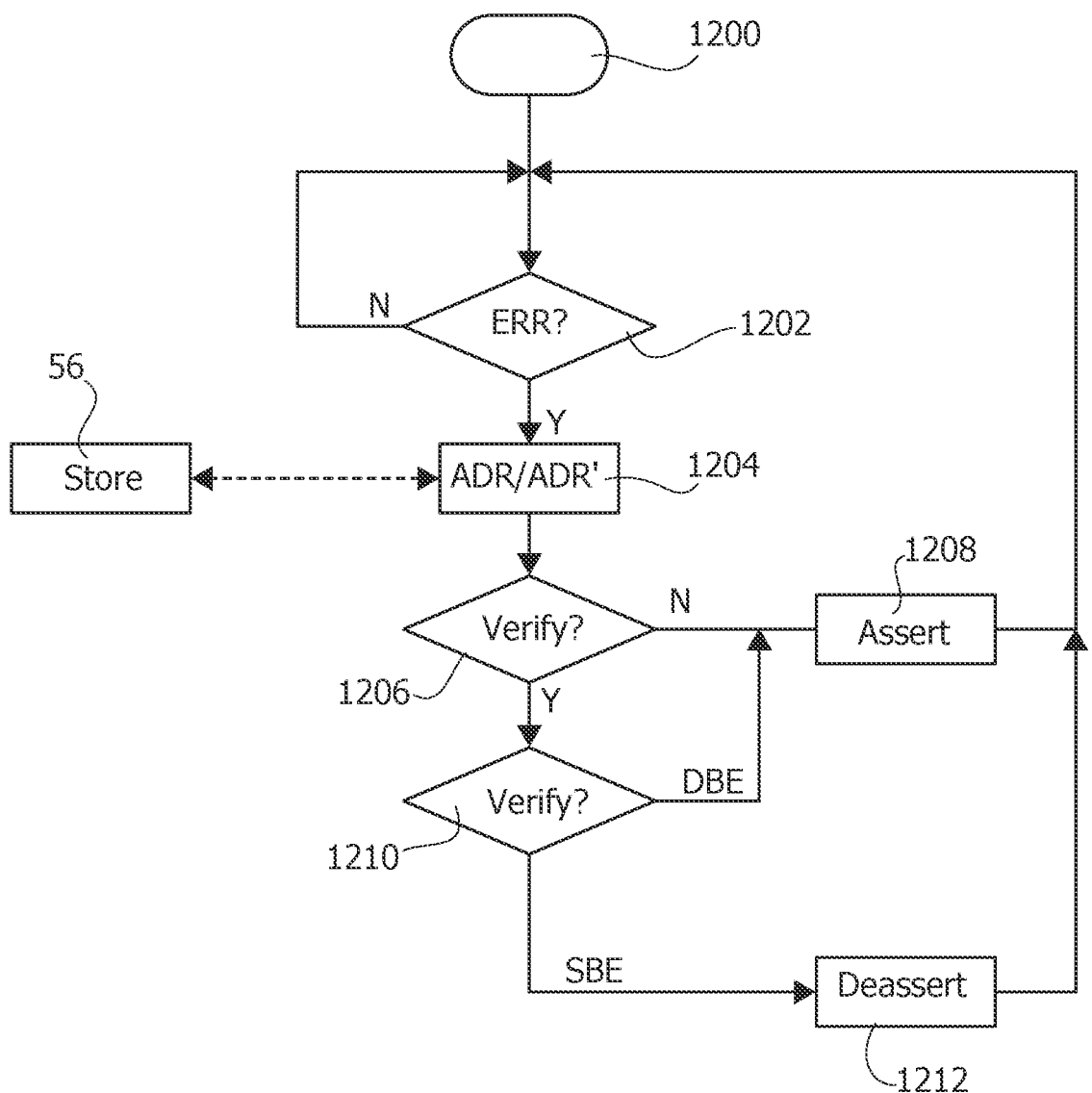
FIG. 11 shows the operation of a second sub-circuit of the error detection and correction circuit of FIG. 9.

In this respect, FIG. 11 shows an embodiment of the operation of a second sub-circuit of the control circuit 54, which implements a parallel process of the control circuit 54. Generally, based on the architecture of the first subcircuit, the second sub-circuit may be implemented via a sequential logic circuit or just a combinational logic circuit.

Specifically, after a start step 1100, which is, e.g., started when the processing system 10*a* is switched on, the control circuit 54 waits at a step 1202 whether an error is signaled by the error detection circuit 46, e.g., whether an error signal ERR is asserted. In case the control circuit 54 determines that no error has been signaled (output "N" of the verification step 1202), the control circuit may thus return to the step 1202.

Conversely, in case the control circuit 54 determines that an error has been signaled (output "Y" of the verification step 1202), the control circuit 54 proceeds to a step 1204. Specifically, at the step 1204, the control circuit 54 determines whether the address ADR (or ADR') associated with the request having generated the error is stored to the memory 56.

In this respect, in case of an error, the error signal ERR will only be asserted at the second clock cycle. However, in case the control circuit 54 determines that the address ADR (or ADR') is not stored to the memory 54, the request may be processed in a single clock cycle. Accordingly, in order to correctly use the address ADR (or ADR') associated with the request having generated the error is stored to the memory 56, the control circuit 54 may be configured to temporary store the address of each read request, e.g., at the step 1104 of FIG. 10. Accordingly, the control circuit 54 may use at the step 1204 the temporary stored address.

Moreover, the control circuit manages at the step 1204 the storage of the address ADR (or ADR') to the memory 56. Generally, when the memory 56 is empty, the control circuit 54 may add the address to the memory 56, e.g., by storing the address ADR (or ADR') to the first slot S1.

However, for further errors, the control circuit 54 may use different strategies.

For example, in the simplest case, the control circuit 54 may be configured to use the memory as a ring memory, wherein—even in case the memory comprises also the same address—the control circuit 54 simply adds the address to a next memory slot of the memory, wherein the control circuit overwrites the oldest memory slots.

Conversely, in other embodiments, the control circuit 54 is configured to add the addresses, which are not already stored to the memory 56. Preferably, in this case, the control circuit 54 may also associate further data with each address stored to a memory slot, such as a number of occurrences of errors for the respective address and/or data identifying a time stamp of the last error for the respective address. Accordingly, in this case, the above additional data may be used by the control circuit 54 in order to decide, e.g., when the memory 54 is full and/or periodically, whether to clear a given memory slot.

Generally, in various embodiments, a given address may also be removed from the memory 56 when the error detection circuit 46 does not signal an error during a following read request.

Next, the control circuit 54 proceeds to a verification step 1206. Specifically, in case the control circuit 54 determines that the address ADR (or ADR') associated with the request having generated the error was already stored to the memory 56 (output "Y" of the verification step 1210), the control circuit 54 already determines at the steps 1104 and 1106 of FIG. 10 that two clock cycles are required to provide corrected data.

Accordingly, in this case, the control circuit 54 may return to the step for waiting for a further error. Specifically, as schematically shown via a step 1212, in this case the control circuit 54 may de-assert the retry signal RETRY, in order to signal to the master circuit 40 the fact that the master circuit 40 should not repeat the request.

However, in various embodiments, the error detection and correction circuit 500 may support an ECC code permitting to correct a given number of flipped bits and just detect a higher number of flipped bits, such as a SECDED code. In this case, the control circuit 54 may proceed to an optional step 1210, where the control circuit 54 verifies the error signal(s) ERR in order to determine whether the error is a correctable or uncorrectable error. Specifically, in case the control circuit determines a correctable error (output "SBE" of the verification step 1210), such as a single bit error, the control circuit 54 may return to the step 1202 via the step 1212. Conversely, in case the control circuit determines an uncorrectable error (output "DBE" of the verification step 1210), such as a double bit error, the data CDATA provided by the error correction circuit 48 indeed do not contain corrected data. Accordingly, in this case, the control circuit 54 may assert at a step 1208 the retry signal RETRY, in order to signal to the master circuit 40 the fact that the master circuit 40 should repeat the read request and the control circuit 54 may then return to the step 1202.

Conversely, in case the control circuit 54 determines that the address ADR (or ADR') associated with the request having generated the error was not stored to the memory 56 (output "N" of the verification step 1210), the control circuit 54 may proceed also to the step 1208. In fact, in this case, the control circuit 54 determines at the steps 1104 and 1106 of FIG. 10 that just one clock cycles was required to provide the data DATA, even though indeed the data CDATA would have to be used after two clock cycles. Accordingly, also in this case, the control circuit 54 may assert at the step 1208 the retry signal RETRY, in order to signal to the master circuit 40 the fact that the master circuit 40 should repeat the request. In fact, when repeating the request, the respective address will then be stored to the memory 54 and the control circuit 54 will indicate that two clock cycles are required for the processing of the data via the error detection and correction circuit 500.

Accordingly, the solutions described in the foregoing permit to access a slave device 42 in a single clock cycle, and just in case errors are associated with specific addresses, the read request to these addresses is performed with two clock cycles in order to permit that the error correction circuit 48 generates corrected data CDATA, which then may be read by the master circuit 40.

The claims are an integral part of the technical teaching of the disclosure provided herein.

Of course, without prejudice to the principle of the invention, the details of construction and the embodiments may vary widely with respect to what has been described and illustrated herein purely by way of example, without thereby departing from the scope of the present invention, as defined by the ensuing claims.

The invention claimed is:

1. A processing system, comprising:
 a master circuit configured to generate a read request comprising an address, wherein said master circuit generates said read request by asserting a first control signal, wherein said master circuit is further configured to receive N first data bits, a second control signal and a third control signal, and wherein said master circuit operates to:
  determine a logic level of said second control signal, said second control signal having a first logic level indicating that said N first data bits contain valid data and having a second logic level indicating that said N first data bits do not contain valid data;
  determine a logic level of said third control signal, said third control signal having a first logic level indicating to repeat the read request and having a second logic level indicating to not repeat the read request;

read said N first data bits in response to determining that said second control signal has said first logic level; and
repeat said read request in response to determining that said third control signal has said first logic level;
a slave circuit configured to receive said read request and, in response to assertion of said first control signal, provide N second data bits and K Error Correction Code bits associated with said address included in said read request; and
an error detection and correction circuit configured to receive said read request, said N second data bits and said K ECC bits, and provide said N first data bits, said second control signal and said third control signal, wherein said error detection and correction circuit comprises a multiplexer configured to provide said N first data bits by selecting said N second data bits when a selection signal has a first logic level and provide N third data bits when said selection signal has a second logic level, and wherein said error detection and correction circuit is configured to generate said N third data bits by:
  processing said N second data bits and said K ECC bits in order to determine whether said N second data bits do not comprise errors or comprise one or more correctable bit-errors;
  in response to determining that said N second data bits comprise one or more correctable bit-errors, asserting an error signal and generating a bit-flip signature having bits asserted in positions of said one or more correctable bit-errors; and
  generating said N third data bits by inverting bits of said N second data bits at positions for which bits of said bit-flip signature are asserted;
wherein said error detection and correction circuit comprises a pipelined architecture so that said N third data bits are generated with a delay of one clock cycle with respect to the respective N second data bits provided by said slave circuit; and
wherein said error detection and correction circuit comprises an address memory and a control circuit comprising a first subcircuit and a second subcircuit;
wherein said first subcircuit is configured to:
  monitor said first control signal to detect the read request;
  in response to detecting the read request, determine an address associated with said read request and verify whether said address associated with said read request is stored in said address memory;
  in response to determining that said address associated with said read request is not stored in said address memory:
    a) set said selection signal to the first logic level to control said multiplexer to provide said N second data bits; and
    b) set said second control signal to the first logic level to indicate that said N first data bits contain valid data;
  in response to determining that said address associated with said read request is stored in said address memory:
    a) set said second control signal for a first clock cycle to the second logic level to indicate that said N first data bits do not contain valid data;
    b) set said selection signal to the second logic level to control said multiplexer to provide said N third data bits, and
    c) set said second control signal for a second clock cycle following said first clock cycle to the first logic level to indicate that said N first data bits contain valid data;
wherein said second subcircuit is configured to:
  monitor said error signal;
  in response to determining that said error signal is asserted, verify whether said address associated with said read request is stored in said address memory;
  in response to determining that said address associated with said read request is not stored in said address memory:
    a) store said address associated with said read request in said address memory; and
    b) set said third control signal to the first logic level to indicate that the read request should be repeated; and
  in response to determining that said address associated with said read request is stored in said address memory:
    a) set said third control signal to the second logic level to indicate that the read request should not be repeated.

2. The processing system according to claim 1:
wherein said error detection and correction circuit is configured to process said N second data bits and said K ECC bits in order to determine whether said N second data bits comprise an uncorrectable bit-error, and in response to determining that said N second data bits comprise the uncorrectable bit-error, assert a further error signal; and
wherein said second subcircuit is configured to:
  monitor said further error signal; and
  in response to determining that said further error signal is asserted, set said third control signal to the first logic level indicating to repeat the read request.

3. The processing system according to claim 1, wherein said address memory has a given number of memory slots, and wherein said second subcircuit is configured to:
  in response to determining that said address associated with said read request is stored in said address memory, manage said address memory as a ring memory and store said address associated with said read request to a next memory slot of said ring memory.

4. The processing system according to claim 1, wherein said address memory has a given number of memory slots, and wherein said second subcircuit is configured to:
  in response to determining that said address associated with said read request is stored to said address memory, manage said memory as a ring memory and associate with each univocal address stored to a given memory slot respective further data, said further data specifying one or more of a number of occurrences of error and a last access time.

5. The processing system according to claim 1, wherein said address associated with said read request corresponds to the address included in said read request.

6. The processing system according to claim 1, wherein said processing system comprises an address decoder configured to determine said address associated with said read request by mapping the address included in said read request.

7. The processing system according to claim 1, wherein said master circuit is a microprocessor and said slave circuit is a Tightly Coupled Memory (TCM).

8. The processing system according to claim 7, wherein said microprocessor is an ARM based microprocessor.

9. The processing system according to claim 1, wherein said pipelined architecture of said error detection and correction circuit is implemented via a register configured to store said N second data bits and said K ECC bits.

10. The processing system according to claim 1, wherein said pipelined architecture of said error detection and correction circuit is implemented via a register configured to store said error signal and said bit-flip signature.

11. The processing system according to claim 1, wherein said N third data bits are generated with a delay of one clock cycle with respect to the respective N second data bits provided by said slave circuit.

12. An integrated circuit comprising a processing system according to claim 1.

13. A device, comprising a plurality of processing systems, wherein at least one processing system of said plurality of processing systems comprises a processing system according to claim 1, and wherein the processing systems of said plurality of processing systems are connected via a communication system.

14. The device according to claim 13, wherein said device is a vehicle.

15. A processing system, comprising:
a master circuit configured to generate a read request comprising an address;
a slave circuit configured to receive said read request and respond thereto by providing N first data bits and K Error Correction Code bits;
a register configured to store the N first data bits and K Error Correction Code bits in response to a clock signal;
an error detection circuit configured to receive the N first data bits and K Error Correction Code bits output from the register, and process the N first data bits and K Error Correction Code bits to assert an error signal when correctable bit errors are present in said N first data bits and generate a bit-flip signature signal identifying positions of said correctable bit errors;
an error correction circuit configured to receive the N first data bits, the error signal and the bit-flip signature signal, apply the bit-flip signature signal to the N first data bits to generate N second data bits when the error signal is asserted and generate a control signal having a first logic state when the error signal indicates that correctable bit errors are present and having a second logic state when the error signal indicates that no bit errors are present; and
a multiplexer circuit having a first input configured to receive the N first data bits output from the register and a second input configured to receive the N second data bits output from the error correction circuit and having a selection input configured to receive the control signal for controlling selection between the N first data bits and N second data bits for output as N third data bits for delivery to the master circuit.

16. The processing system of claim 15, further comprising:
an address memory; and
a control circuit, wherein said control circuit is configured to:
determine whether the address is stored in the address memory; and
when the address is not stored in the address memory:
set the control signal to cause the multiplexer circuit to select the N first data bits output from the register for output as the N third data bits for delivery to the master circuit; and
signal the master circuit that the N first data bits output from the register contain valid data.

17. The processing system of claim 16, further comprising, when the address is stored in the address memory, the control circuit operating to:
signal the master circuit over one cycle of the clock signal that the N first data bits output from the register do not contain valid data;
set the control signal to cause the multiplexer circuit to select the N second data bits output from the error correction circuit for output as the N third data bits for delivery to the master circuit; and
then signal the master circuit for a following cycle of the clock signal that the N first data bits output from the register contain valid data.

18. The processing system of claim 15, further comprising:
an address memory; and
a control circuit, wherein said control circuit is configured to:
determine whether the address is stored in the address memory; and
when the address is stored in the address memory:
signal the master circuit over one cycle of the clock signal that the N first data bits output from the register do not contain valid data;
set the control signal to cause the multiplexer circuit to select the N second data bits output from the error correction circuit for output as the N third data bits for delivery to the master circuit; and
then signal the master circuit for a following cycle of the clock signal that the N first data bits output from the register contain valid data.

19. The processing system of claim 15, further comprising:
an address memory; and
a control circuit, wherein said control circuit is configured to:
in response to assertion of the error signal, determine whether the address is stored in the address memory; and
when the address is not stored in the address memory:
store the address in the address memory; and
signal the master circuit to repeat said read request.

20. The processing system of claim 19, further comprising, when the address is stored in the address memory, signal the master circuit not to repeat said read request.

21. The processing system of claim 15, wherein the error detection circuit is further configured to process the N first data bits and K Error Correction Code bits to assert a further error signal when uncorrectable bit errors are present in said N first data bits, and further comprising a control circuit configured to:
in response to assertion of the further error signal, signal the master circuit to repeat said read request.

22. The processing system of claim 15, further comprising an address decoder configured to determine said address associated with said read request by mapping the address included in said read request.

23. The processing system of claim 15, wherein said master circuit is a microprocessor and said slave circuit is a Tightly Coupled Memory (TCM).

24. The processing system of claim 23, wherein said microprocessor is an ARM based microprocessor.

* * * * *